Nov. 9, 1965  G. G. WELSH  3,217,253
VISUALLY INDICATING ELECTRICAL MEASURING INSTRUMENT USING
PROJECTED LIGHT BEAM
Filed May 8, 1961  4 Sheets-Sheet 1

INVENTOR
George Gilbert Welsh
BY
Peck & Peck
ATTORNEY

Nov. 9, 1965              G. G. WELSH                3,217,253
        VISUALLY INDICATING ELECTRICAL MEASURING INSTRUMENT USING
                           PROJECTED LIGHT BEAM
Filed May 8, 1961                                 4 Sheets-Sheet 2

Fig. 2.

INVENTOR
George Gilbert Welsh
BY
Peck & Peck
ATTORNEY

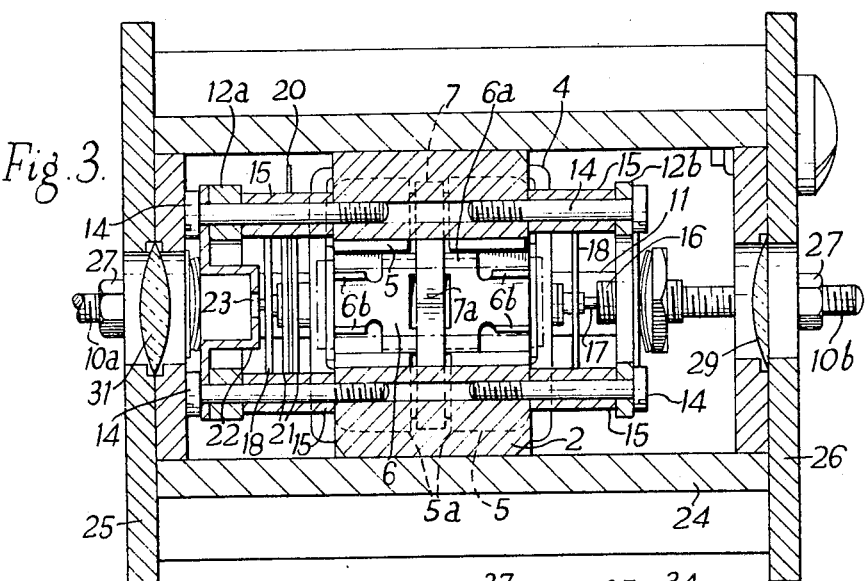
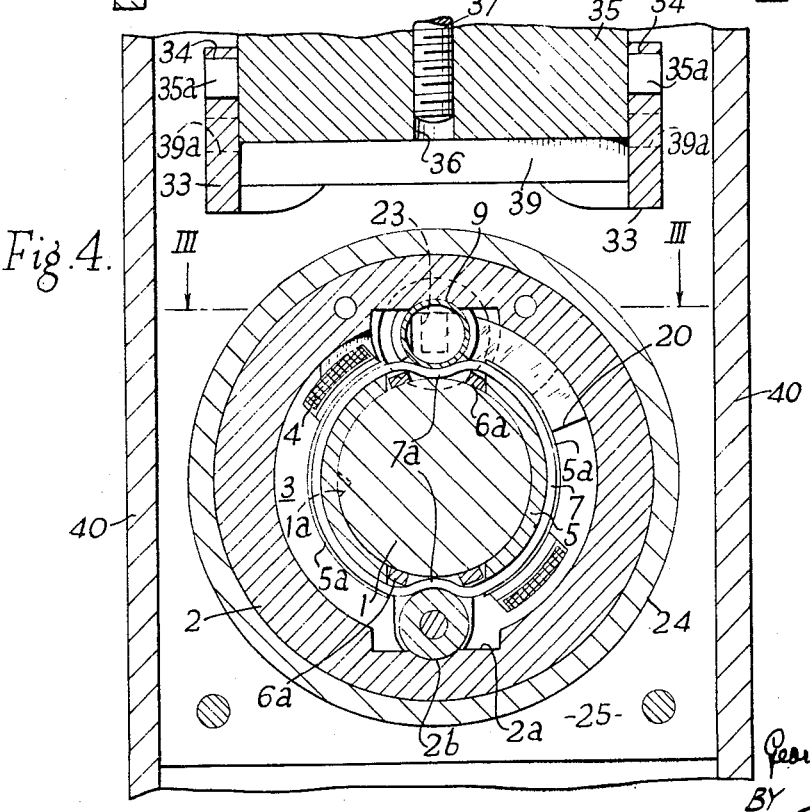

United States Patent Office 3,217,253
Patented Nov. 9, 1965

3,217,253
VISUALLY INDICATING ELECTRICAL MEASURING INSTRUMENT USING PROJECTED LIGHT BEAM
George Gilbert Welsh, St. Albans, England, assignor to The Electrical Apparatus Company, Limited, St. Albans, England, a company of Great Britain
Filed May 8, 1961, Ser. No. 108,660
2 Claims. (Cl. 324—151)

This invention relates to visually indicating electrical measuring instruments for producing a visual indication of the magnitude of an electrical quantity being measured by the instrument.

According to the invention a visually indicating electrical measuring instrument of this character comprises a movement having a part adapted to be displaced proportionally to the magnitude of the quantity, means for directing a beam of light through a selected location in the vicinity of the movement on to a viewing screen, an element so mounted on the displaceable part of the movement that an area thereof will be moved progressively through the selected location as the magnitude of the quantity varies over a predetermined range of values and a series of symbols each representative of a different value within this range delineated on said area of the element by appropriately shaped light-transmitting parts thereof at such locations that the respective one of the symbols will be positioned at the selected location in the path of the beam of light when the value of the magnitude of the electrical quantity is that represented by said symbol.

The selected location is preferably within the boundaries of the movement and a light-transmitting aperture aligned with the beam of light is then formed through the movement.

With advantage the means for directing the beam of light comprises an optical system adapted to produce on the screen an enlarged image of the symbol positioned at the selected location.

Preferably, the movement comprises a magnet system with an annular air gap and the displaceable part thereof is a moving coil pivotally mounted with its legs working in the annular air gap.

Figure 1:
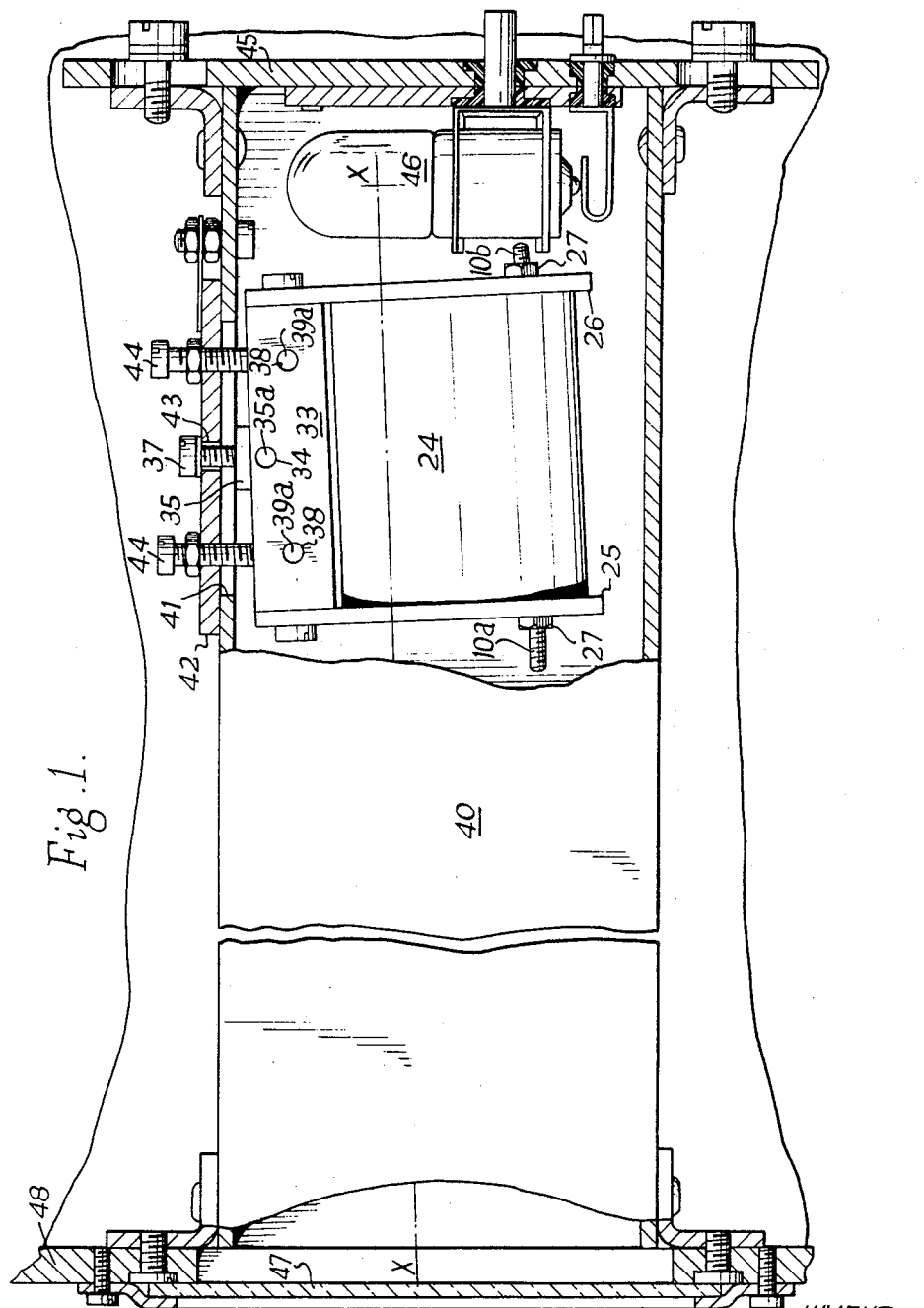
Figure 5:
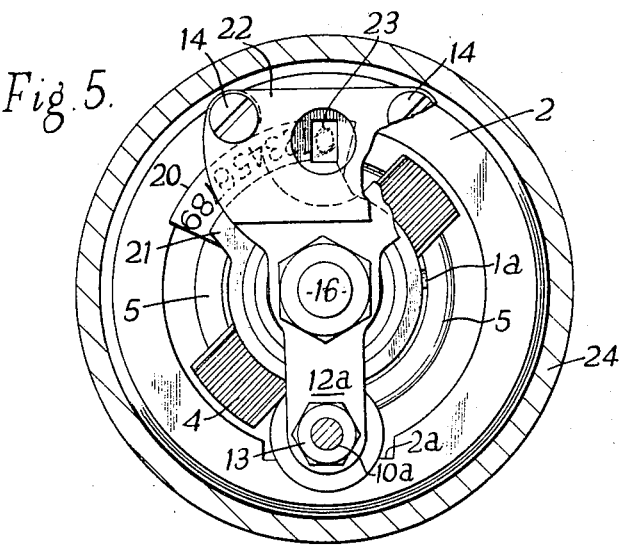
Figure 6:
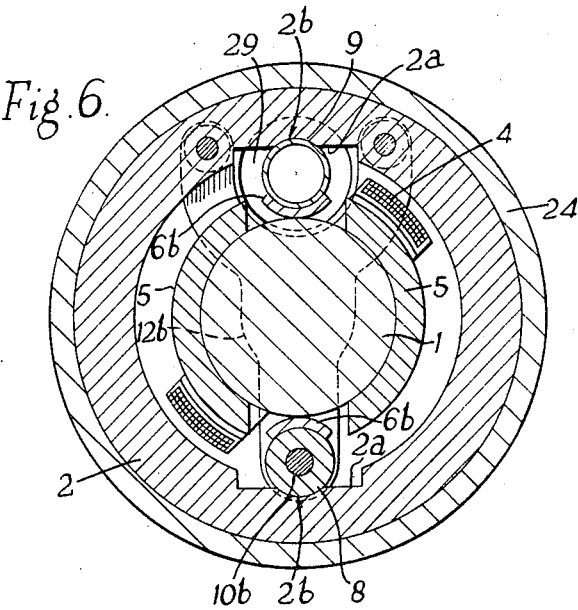

Other features of the present invention will become apparent from the following description of one example of an electrical indicating instrument embodying the invention, reference being made to the accompanying drawings wherein:

FIG. 1 is a side elevation of the instrument with some parts broken away and others shown in section, FIG. 2 is a longitudinal section, to a larger scale, of the movement and its mounting, FIG. 3 is a section taken on the line III—III of FIG. 4, FIG. 4 is a section taken on the line IV—IV of FIG. 2, FIG. 5 is a section taken on the line V—V of FIG. 2, and FIG. 6 is a section taken on the line VI—VI of FIG. 2.

The instrument illustrated includes a movement which comprises a cylindrical permanent magnet core 1 (FIGS. 2, 4 and 6) which is magnetised in a direction parallel with a particular diametral plane thereof that is indicated by a notch 1a cut in one end face of the core (see FIGS. 4 and 5). There is also an annular yoke 2 of magnetisable material surrounding the core 1 to provide an external return magnetic path, the yoke being disposed coaxially with the core to leave between them an annular air gap 3 in which work the legs of a moving coil 4 which encircles the core and is pivotally mounted so that the passage of an electric current through the coil will cause an angular deflection of the coil proportional to the magnitude of the current. The coil is subjected to the action of flat spiral return springs which tend to hold it in a zero position and may be used to conduct current to and from the coil.

The core is of smaller diameter than the desired inner diameter of the air gap 3 and is made up to the required dimension by clamping two part-annular pole-pieces 5 (FIGS. 4 to 6) of magnetisable material thereon, these pole-pieces each subtending an angle of approximately 120° at the centre of the core and being disposed symmetrically about that diametral plane of the latter (indicated by the notch 1a) which represents the direction of magnetisation thereof. The gaps between the adjacent ends of the pole-pieces are occupied by sheet brass pressings 6 each having a central slotted portion 6a (FIGS. 3 and 4) fitting closely to the curved surface of the permanent magnet 1 and fitting closely between the respective ends of the pole pieces 5 and two end portions 6b (FIG. 3) which are narrower than and curved in the reverse sense to the central portion 6a. The pole-pieces 5 and the pressings 6 are clamped around the permanent magnet 1 by a brass ring 7 which is disposed in a central circumferentially extending groove 5a in each pole-piece and is deformed inwards (at 7a) into the slots in the central portions 6a of the pressings in order to bind the whole tightly together (see FIGS. 3 and 4).

At diametrically opposite locations the yoke 2 is formed internally with channels 2a (FIGS. 4 to 6) directed parallel with its axis and centrally of the base of each channel is formed a longitudinal groove 2b of part-circular shape in cross-section. The core assembly 1, 5, 6, 7, is positioned in the aperture of the yoke 2 (the moving coil 4 having first been placed over the core) so that the pressings 6 are opposite the part-circular grooves 2b in the yoke and tubular brass elements 8 and 9 (FIGS. 2, 4 and 6) are inserted axially so that each fits closely, at one side, into the respective groove 2b and, at the other side, into the end portions 6b of the respective pressing 6. The core assembly is thus locked against rotation relative to the yoke 2.

One of the tubular brass elements, that marked 8, is internally screw-threaded and receives at each end a screw-threaded stud 10a or 10b upon which is slipped a tubular distance piece 11 and the apertured end of a bridge-piece 12a or 12b, the latter being clamped in position by a nut 13 threaded on the respective stud. Each bridge-piece extends diametrically across the core to beyond the centre thereof and then bifurcates, each extremity of its bifurcated end being secured to the yoke 2 by a screw 14 with the interposition of a tubular distance piece 15 (see FIG. 3). At the centre of each bridge-piece is mounted the jewel or other bearing 16 (FIG. 2) for the respective conical pivot 17 mounted on the adjacent cross-limb of the moving coil 4, the usual flat spiral return springs 18 being provided one at each end of the coil assembly with one end anchored to the pivot and the other end anchored to the cranked end of an arm (not indicated) which is rotatably adjustable about the respective bearing for the purpose of zeroising the moving coil while no current is flowing therein.

The second of the tubular brass elements inserted between the core assembly and the yoke, i.e. that marked 9, is suitably secured against axial displacement by means which will not obstruct the passage 19 through the element, for example, by forming the one end of the element with an external flange 9a and securing a nut 9b on the other end, as shown in FIG. 2. There is mounted on the moving coil assembly, at the end adjacent to the bridge-piece 12a, a flat translucent or transparent sector-shaped sheet 20 clamped between thin brass discs 21 secured on the respective pivot 17, the exposed arcuate marginal portion of the sheet being of such dimensions and so disposed that it will be traversed over the adjacent end of the passage 19 as the moving coil 4 is angularly deflected. This marginal portion carries appropriate indications, specifically a series of numerals from 0 to 9, as shown in FIG. 5, spaced to represent progressive incremental deflections of the coil 4. On the bridge-piece 12a is mounted (by means of the respective screws 14) between its bifurcations an opaque masking element 22 having a small rectangular aperture 23 which is symmetrically disposed about the axis of the passage 19 through the tubular brass element 9 and of a size sufficient to expose to view one only of the numerals on the marginal portion of the sheet at a time.

The instrument movement thus far described is fitted slidably into a tube 24 (see FIG. 2) which is then closed by front and rear end plates 25 and 26, respectively, that project laterally beyond the tube 24 at one side for a purpose to be described below. The screw-threaded studs 10a, 10b employed to secure the non-bifurcated ends of the bridge-pieces 12a, 12b of the movement extend through apertures in the end plates and receive nuts 27 by means of which the movement as a whole may be adjusted axially of the tube 24 for focussing purposes.

In the rear end plate 26 is formed an aperture 28 in line with the unobstructed passage 19 through the tubular brass element 9 and behind this aperture is secured a suitable condensing lens 29. The front end plate 25 is formed with a similarly disposed aperture 30 behind which is secured a suitable object lens 31 (see FIGS. 2 and 3). The rear end plate is also provided with means (such as the rotatable bush 32) whereby the zeroising device of the movement may be actuated from the exterior of the enclosure in which the movement is contained.

The laterally projecting portions of the end plates 25, 26 are interconnected externally of the tube 24 by spaced parallel strips 33 (FIGS. 2 and 4) extending parallel with the axis of the tube. At the centre of length of each strip near the outer free edge thereof is formed an aperture 34 (FIGS. 1 and 4) in which engages one of the two coaxial pivots 35a formed on the ends of a transverse square-section rod 35 extending between the strips. This rod is formed from one face with a centrally disposed screw-threaded aperture 36 in which is engaged a clamping screw 37. Each of the strips 33 is formed near each end with an aperture 38 (see FIG. 1) disposed centrally of its width and two further transverse square-section rods 39 (FIG. 2) having coaxial pivots 39a at their ends are arranged between the strips with their pivots rotatably engaged in the respective apertures 38 therein.

The unit containing the movement which has thus been constituted is disposed inside one end of a horizontal tube 40 (FIGS. 1 and 4) of rectangular cross-section with the transverse rods 35, 39 located near the top wall of the tube, the end plates 25, 26 of the unit fitting closely between the side walls of the tube (see FIG. 4) but having their upper and lower edges spaced somewhat from the top and bottom walls of the latter. In the top wall of the tube 40 is formed a longitudinally extending slot 41 of a width less than the length of the transverse rods 35, 39 and over this slot is laid a sliding plate 42. The clamping screw 37 engaged with the central transverse rod 35 passes freely through an aperture 43 formed in the sliding plate 42 and the rod 35 is of such a cross-section that its upper face can be drawn tightly against the edges of the slot 41 by tightening the screw while leaving the unit free to pivot to a limited extent about the ends 35a of the rod. It will be seen that the position of the unit lengthwise of the tube 40 may be adjusted by slackening the clamping screw 37 and sliding the plate 42 along the tube, re-tightening of the screw causing the transverse rod 35 and the plate 42 to be drawn together to clamp the edges of the slot 41 between them.

Screw-threadedly engaged in apertures in the sliding plate 42 are two adjusting screws 44 so disposed that one can bear upon a face of the forward transverse rod 39 and the other upon a face of the rearward transverse rod 39 of the unit. Suitable adjustment of these screws 44 causes the unit as a whole to be rocked about its pivotal support so that the inclination of the axis of the unit in relation to the axis of the tube 40 may be varied as desired (within the limits of adjustment possible) and the unit may yet be rigidly locked in its adjusted position.

The end of the tube 40 at the rear of the unit is closed by an end plate 45 (see FIG. 1) upon which is mounted internally an electric lamp 46 having means for adjusting its position so that its filament (which is as concentrated as possible) can be brought to lie on the optical axis X—X of the lens system comprising the condensing lens 29 and object lens 31 mounted on the unit. At the opposite end of the tube 40 is disposed a ground glass or other translucent screen 47, either secured across the end of the tube or (as shown) forming part of an instrument panel 48 behind which the tube 40 is to be mounted. The correct focussing of the beam of light is achieved by adjusting the unit lengthwise of the tube 40 and the correct positioning of the projected image upon the screen 47 is ensured by adjusting the inclination of the axis of the unit in relation to the axis of the tube 40, the position of the lamp 46 being adjusted as necessary.

It will be appreciated that when the instrument is in use the light from the lamp 46 will pass through the condensing lens 29, the passage 19 in the tubular brass element 9, the marginal portion of the sector-shaped translucent sheet 20 carried by the moving coil 4, the aperture 23 in the mask 22 and the object lens 31, in that order, to the translucent screen 47. Hence any indication carried on the portion of the sector-shaped sheet 20 disposed opposite the aperture 23 in the mask at any time will be projected on to the screen 47 to be visible from the face thereof. The indications are preferably provided as translucent or transparent areas on an opaque background and may with advantage be produced photographically.

With advantage, a rod of a transparent material, such as a suitable plastics material, having one end formed concave and the other convex (so that it constitutes a collimating lens) may be fitted in the passage 19 of the element in order to increase the intensity of the image produced on the screen 47.

The whole instrument is of quite small construction, for example, the outer tube 40 may be 1¼″ x 1¾″ x 6″ long, but the indications shown on the screen may be quite large so that they are readable from some distance.

I claim:

1. A visually indicating electrical measuring instrument comprising a magnet system including a cylindrical core surrounded by an annular air gap, a coil angularly displaced about the axis of said core to move in said air gap substantially proportionally to the magnitude of an electric current being measured and flowing through said coil, said coil in its maximum displacements leaving a part of said air gap untraversed by the coil, a light source, a viewing screen, optical means for directing light from said source toward said screen in the form of a beam passing through said part of said air gap in a direction parallel with said axis, a flat sector mounted on said coil and movable therewith, the medial plane of said flat sector being at right angles to said axis, and said sector having a curved zone which is traversed through said beam as said coil is angularly displaced, and light-transmitting and opaque areas in said zone defining symbols representative of different magnitudes of said electric current and said areas being so spaced so that the symbol appropriate to the measured magnitude of said current will be brought into said beam by the passage of said current through said coil.

2. A visually indicating electrical measuring instrument including, in combination, a meter movement, said meter movement comprising a transversely magnetized cylindrical permanent magnet core, an annular yoke of magnetizable material surrounding said core but spaced radially therefrom to provide an annular air gap, a coil surrounding said core and supported for angular movement about the axis of said core through part only of the length of said air gap, the angular displacement of said coil being substantially proportional to the magnitude of an electric current being measured and flowing through said coil, and a light source, a viewing screen, optical means for directing a beam of the light from said source toward said screen parallel with said axis through a part of said air gap outside the range of angular displacement of said coil, a flat sector mounted on said coil so that its medial plane is at right angles to said axis and said sector is provided with a curved zone which will be traversed through said light beam as said coil is angularly displaced, said flat sector being contained entirely within the confines of said meter movement, and light-transmitting and opaque areas in said zone together defining a series of symbols respectively representative of different magnitudes of said electric current and so spaced that the symbol representative of the measured magnitude of the current will be brought into said beam by the displacement of said coil caused by the passage of said current therethrough.

References Cited by the Examiner

UNITED STATES PATENTS

| | | | |
|---|---|---|---|
| 1,893,421 | 1/33 | Latzko | 324—97 |
| 2,086,769 | 7/37 | Hasbrouck | 324—97 |
| 2,154,080 | 4/39 | Zimmerman | 324—97 |
| 2,250,969 | 7/41 | Seefeld | 324—151 |
| 2,875,411 | 2/59 | Lamb | 324—151 |
| 2,935,729 | 5/60 | Henss | 88—24 |

FOREIGN PATENTS 889,189   8/53   Germany.

FREDERICK M. STRADER, *Primary Examiner.*

WALTER L. CARLSON, *Examiner.*